United States Patent [19]

Bauer

[11] Patent Number: 5,201,580
[45] Date of Patent: Apr. 13, 1993

[54] IMPINGEMENT MIXING DEVICE

[75] Inventor: Adolf Bauer, Olching, Fed. Rep. of Germany

[73] Assignee: Krauss Maffei Aktiengesellschaft, Munich, Fed. Rep. of Germany

[21] Appl. No.: 576,107

[22] Filed: Aug. 29, 1990

Related U.S. Application Data

[63] Continuation of Ser. No. 327,379, Mar. 23, 1989, abandoned, which is a continuation of Ser. No. 884,917, Jul. 14, 1986, abandoned.

[30] Foreign Application Priority Data

Jul. 12, 1985 [DE] Fed. Rep. of Germany ......... 352500

[51] Int. Cl.⁵ .............................................. B01F 15/02
[52] U.S. Cl. .................................... 366/159; 366/182; 425/817 R; 422/135
[58] Field of Search ................................ 366/159–162, 366/177, 182, 192, 193; 222/135, 138, 145; 422/131, 133, 135; 425/200, 207, 217, 542, 543, 817 R

[56] References Cited

U.S. PATENT DOCUMENTS

| | | |
|---|---|---|
| 3,263,928 | 8/1966 | Gusmer . |
| 3,706,515 | 12/1982 | Keuerleber et al. . |
| 3,858,852 | 1/1975 | Breer et al. .......................... 366/177 |
| 3,964,731 | 6/1976 | Ernst .............................. 366/159 X |
| 3,975,128 | 8/1976 | Schlueter . |
| 4,013,391 | 3/1977 | Boden et al. .................... 366/159 X |
| 4,115,299 | 9/1978 | Muehle . |
| 4,291,991 | 9/1981 | Schulte et al. ....................... 366/159 |
| 4,473,531 | 9/1984 | Macosko et al. . |

FOREIGN PATENT DOCUMENTS

| | | |
|---|---|---|
| 1282522 | 7/1969 | Fed. Rep. of Germany . |
| 2364501 | 7/1975 | Fed. Rep. of Germany . |
| 3019548 | 11/1981 | Fed. Rep. of Germany . |

Primary Examiner—Harvey C. Hornsby
Assistant Examiner—Mark Spisich
Attorney, Agent, or Firm—Robert J. Koch

[57] ABSTRACT

A mixing device exhibiting a mixing chamber, feed and recirculation lines for components and for the component mixture. A control piston reciprocates inside the mixing chamber between a recirculation position where the feed and recirculation lines are in fluid communication and a mixing position where the components impinge and mix in the mixing chamber. At least one component has a straight line recirculation path from its feed to return line through a radial slot in the control piston. A bypass line branches off from at least one feed line and opens into the mixing chamber at a mixing input duct in the same radial plane as a mixing input duct for a second component.

36 Claims, 7 Drawing Sheets

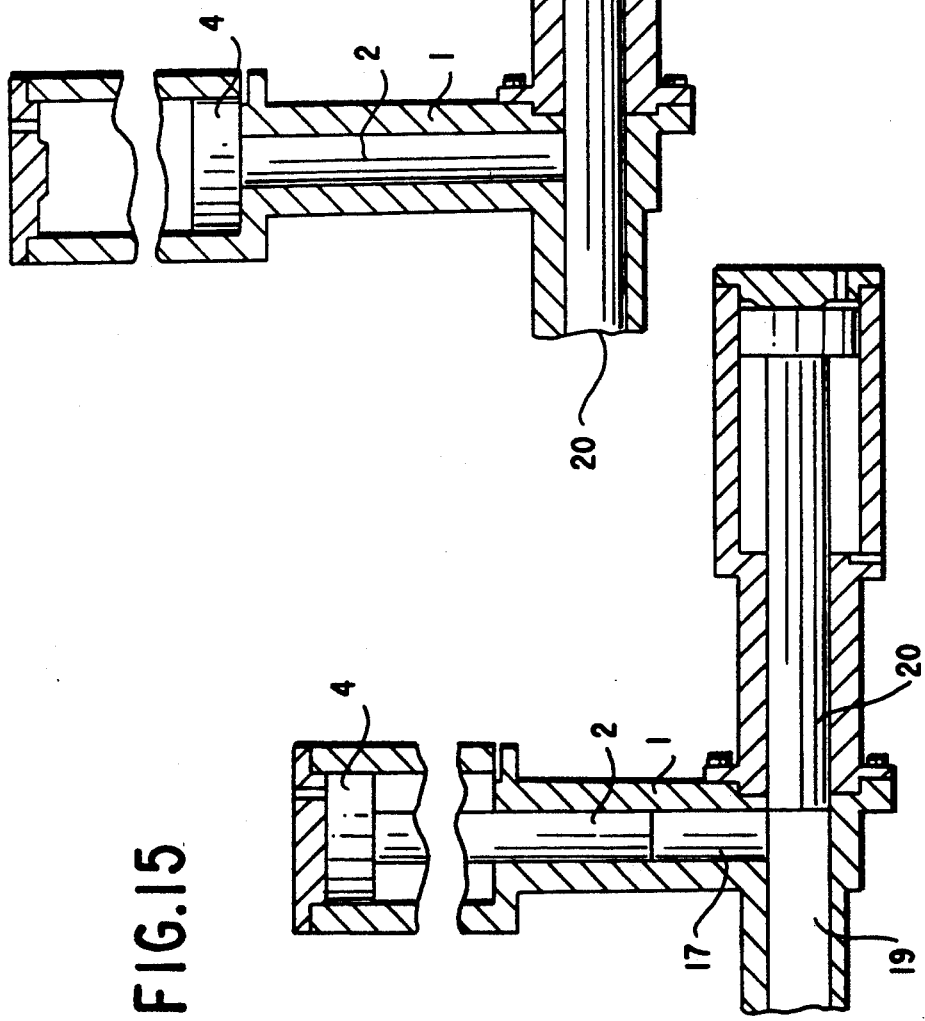

IMPINGEMENT MIXING DEVICE

This application is a continuation of U.S. application Ser. No. 327,379, filed Mar. 23, 1989, now abandoned, which is a continuation of U.S. application Ser. No. 06/884,917, filed Jul. 14, 1986 now abandoned.

BACKGROUND OF THE INVENTION

1. Field of the Invention

The invention relates to an impingement mixing device for two or more components.

2. Description of the Related Art

A device as shown in DE-1,282,522 exhibits axial overflow channels in the lateral surface of a control piston. In the piston's recirculation position the input ducts of the feed lines communicate with the respective outlet ducts of the return lines through the channels. The control piston has a relatively small diameter corresponding to that of the mixing chamber. When two neighboring overflow channels exhibit the maximum flow cross-section there remains only a thin separating wall between the channels in the control piston. A risk exists that a separating wall will erode and fail under the action of the plastic components which are injected into the overflow channels under high pressure during recirculation. This risk is increased when plastic components containing filler materials are utilized. An additional disadvantage of recirculation grooves of the type shown is the diversion of the reactive components through two 90° angles under high pressure. The changes in direction increase flow resistance and result in internal friction causing spurious heating of the components. Additionally, damage to filler components such as breaking of glass fibers results.

In order to maximize the flow cross-sections of the recirculation grooves or overflow channels, the piston is configured so that there is only a small lateral surface between the recirculation grooves. The sealing gap between the piston wall and the cylinder wall therefore exhibits a circumferentially short sealing surface. This increases the risk that the plastic components will leak or flow uncontrolled out of the recirculation grooves under high pressure thereby damaging the mixing device.

DE-OS 30 19 548 shows a mixing chamber exhibiting minimal size and recirculation grooves exhibiting maximal proportions. The control piston shown has a stepped diameter, with the recirculation grooves disposed on the larger-diameter part of the control piston, and with return channels branching off from the channels feeding material to the injection openings. There is the risk in a device according to this embodiment that material will deposit or lodge in the step structure, thus interfering with the control function of the control piston.

SUMMARY OF THE INVENTION

It is an object of the invention to provide an impingement mixing device which reduces or eliminates the deflection of at least one component when the mixing device is operating in a recirculation mode.

An impingement mixing device or "mixhead" exhibits a mixing chamber and at least first and second injection ports or input ducts. The injection ports are arranged in the wall of the cylindrical mixing chamber so as to cause at least two input jets of components for example polyol and isocyanate to impinge either directly or at an angle and thereby mix and react. It is noted that other components, reactive or nonreactive, can also be mixed in the device according to the invention. The mixing chamber is equipped with a mixing piston which reciprocates in the mixing chamber and advantageously embodies a slide valve in order to control the input and/or recirculation of the reactive components. Other mixing heads are described in U.S. Pat. Nos. 3,975,128, 4,115,299 and 3,706,515, the disclosures of which are incorporated herein. It is to be expressly understood that the invention is not limited to only mixing heads having only two component or L-shaped configurations.

According to the invention at least one of the components passes, without undergoing radical changes in direction or substantial impediment, from a feed line to a return line when the mixing device is in the recirculation mode. Due to the absence of multiple laterally disposed recirculation grooves, seals between recirculation flow paths of respective components may be effected by circumferentially arranged seals around the control piston such as ring seals or sealing grooves. Leaks from the feed and return lines of the component and subsequent penetration into the feed and return lines or ducts of another reactive component are prevented in addition to the provision for unimpeded recirculation in accordance with the invention where such feed and return lines of one component are axially disposed from the feed and return lines of another component.

Additional advantageous features and refinements will be apparent from the description of the preferred embodiment.

BRIEF DESCRIPTION OF THE DRAWINGS

The invention is described in more detail with reference to exemplary embodiments illustrated in the drawings:

FIG. 15 shows a schematic cross-section through a two chamber mixing head, in a mixing position, with a control piston and a quieting chamber piston in the retracted position.

FIG. 16 shows a schematic cross-section through a two chamber mixing head, in a recirculation position, with a control piston and a quieting chamber piston in the extended position.

DETAILED DESCRIPTION OF THE PREFERRED EMBODIMENT

Figure 1:
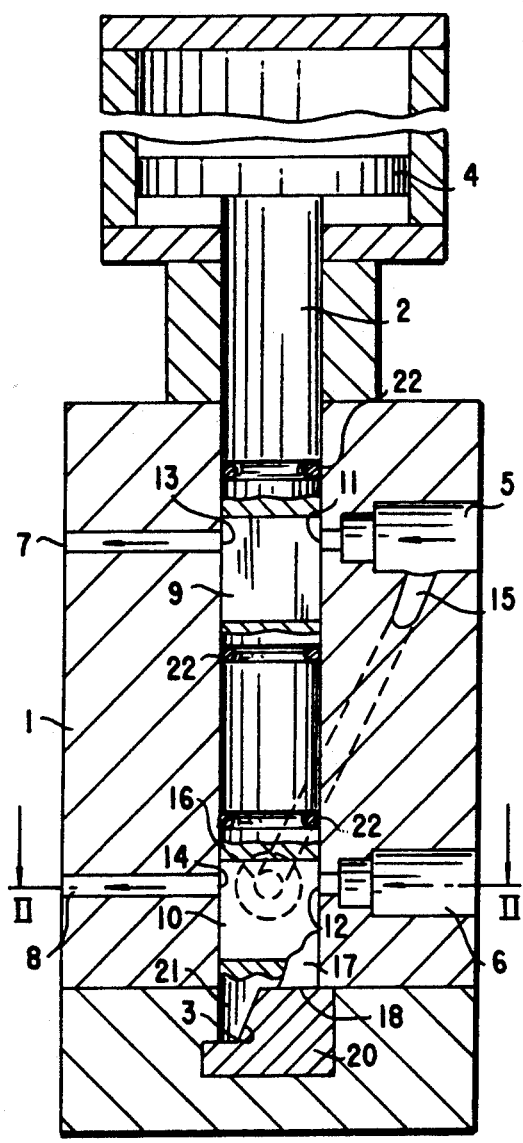
FIG. 1 shows a cross-section view through a mixing chamber and a control piston with a stepped end face in the recirculation position.
Figure 2:
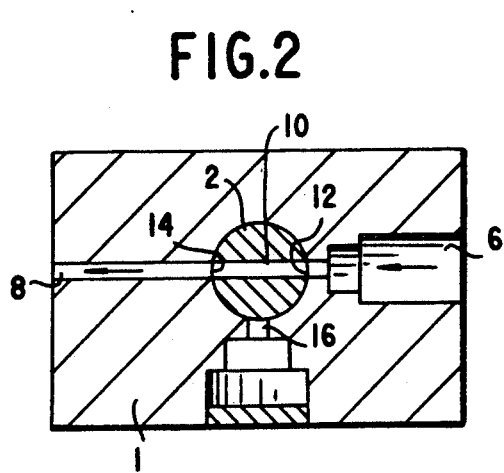
FIG. 2 shows a cross-section through line II—II of FIG. 1.
Figure 3:
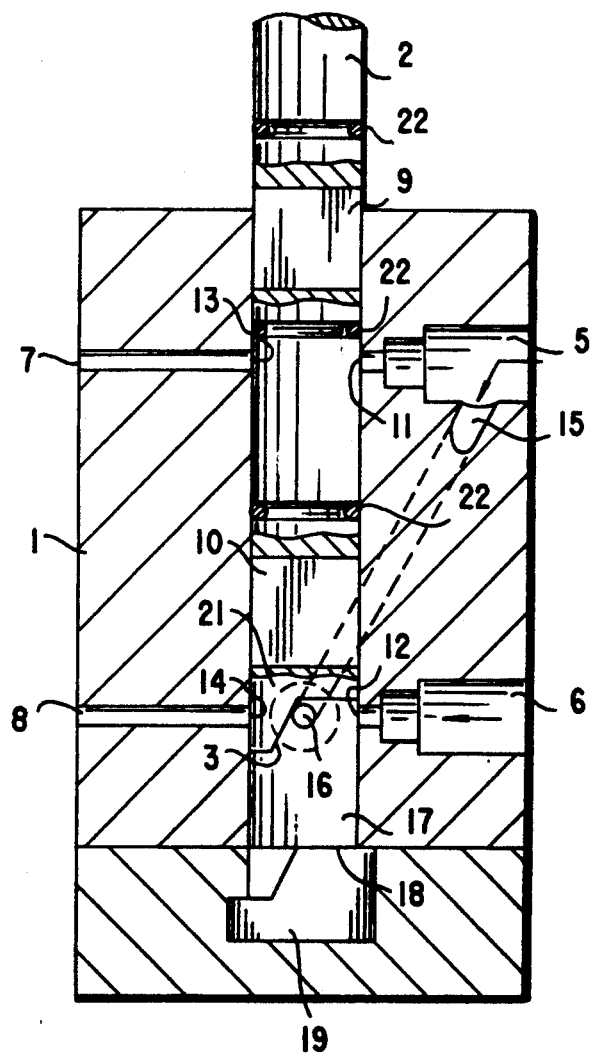
FIG. 3 shows a cross-section through a mixing chamber and a control piston, with a stepped end face, in the mixing position.

FIGS. 1 to 3 illustrate a mixing chamber housing 1 in which a control piston 2 exhibits a stepped end face 3 and reciprocates, between a recirculation position as shown in FIGS. 1 and 2, and a mixing position as shown in FIG. 3, under the force of operating piston 4. The mixing chamber housing 1 further contains two feed lines 5, 6 and respective return lines 7,8 associated with the feed lines. The control piston 2 exhibits radial slots 9, 10. In the recirculation or advanced position of the control piston, infeed ducts 11, 12 associated with the feed lines 5, 6 are in alignment, and directly communicate without impediment, with their respective outlet ducts 13, 14, through the radial slots. A bypass line 15 branches off from one of the feed lines 5 and opens out into the mixing chamber 17 (FIG. 3) at a mixing input duct 16 in the radial plane of the other feed line 6, the radial plane being transverse to the axis of the control piston. A redirecting channel or quieting chamber 19 adjoins the outlet 18 of the mixing chamber and runs at a right angle thereto. A redirecting piston or quieting chamber piston 20 is reciprocally movable in channel 19. The end face 3 of the control piston 2 exhibits a stepped portion 21 which serves to close the return line 8 when the control piston 2 is in the mixing position. The mixing chamber outlet 18 and a portion of the perimeter of the redirecting channel 19 are matched to the stepped end face 3 of the control piston 2. Sealing grooves or ring seals 22 are disposed on control piston 2 axially displaced, above and below, from the radial slots 9, 10.

In the recirculation mode the control piston is in an extended position. The stepped end face 3 closes off the outlet 18 of the mixing chamber. The components supplied through the feed line 5 pass from the exit opening or recirculation input duct 11 into the admission opening or recirculation outlet 13 of the return line 7 via a radial slot 9. The passage or recirculation is not affected by appreciable flow resistance. Due to the aligned arrangement of the feed line 5, exit opening 11, radial slot 9, outlet opening 13, and return line 7, there are no impingement surfaces and the recirculating components do not erode the material of the operating elements of the mixing device or head. The benefit of this configuration is even greater when the components contain abrasive filler materials.

In a similar fashion, a second component recirculates from the feed line 6 and inlet duct 12 to recirculation outlet duct 14 and return line 8, via the radial slot 10 in the mixing chamber or control piston. During the recirculation mode, the mixing input duct or first material input duct 16 of the bypass line 15 is closed off or blocked by the lateral surface of control piston 2.

In the mixing mode the control piston 2 is retracted such that its face 3 defines a rearward boundary of the mixing chamber 17. The mixing input or material input duct 16 of the bypass line 15 and the infeed duct 12 of the feed line 6 are exposed while infeed or recirculation input duct 11 of the feed line 5 and return lines 7 and 8 are all blocked off. The return line 8 and outlet duct 14 are blocked by step member 21. The mixing chamber 17 configuration is progressively smaller in the injection-/impingement region. This configuration is desirable because the mixing action is enhanced due to the reduced dimensions of the mixing chamber in the impingement region.

Figure 4:
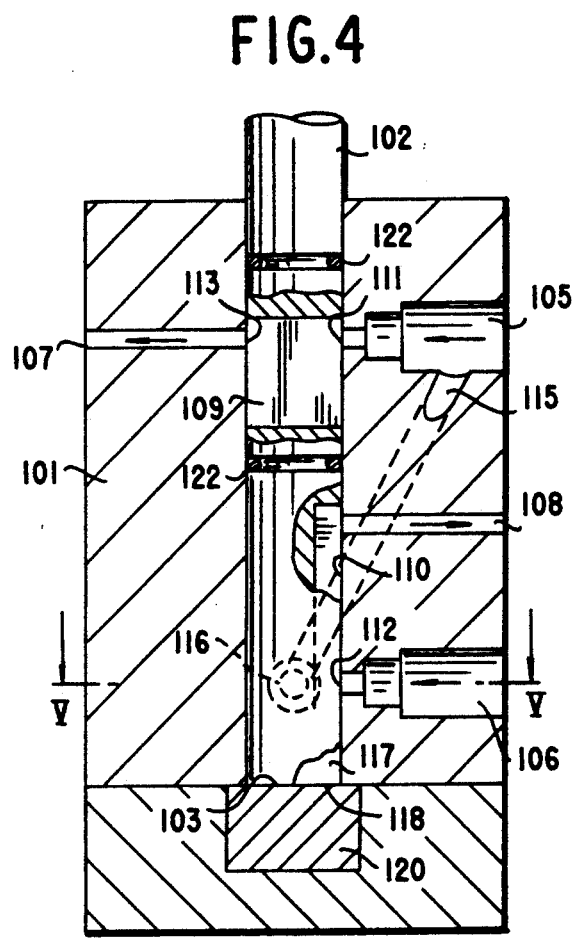
FIG. 4 shows a cross-section through a mixing chamber and a control piston, with an axial recirculation groove, in the recirculation position.
Figure 5:
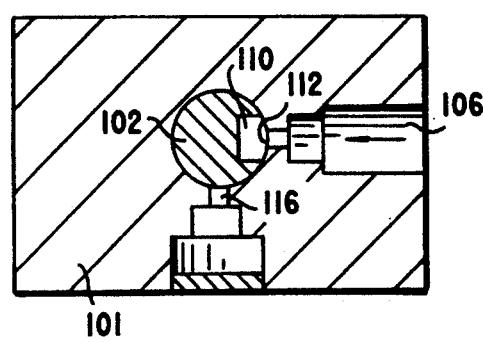
FIG. 5 shows a cross-section through line V—V of FIG. 4.

FIGS. 4 and 5 illustrate a mixing chamber housing 101 with a control piston 102 having a planar end face 103. The piston 102 is shown in its extended or recirculation position. A first feed line 105 communicates with a first return line 107 via a first radial slot 109.

A second feed line 106 and return line 108, both closer to the mixing chamber outlet opening 118 than lines 105 and 107, are disposed in an axially displaced fashion where the second feed line is closer than the second recirculation return line 108 to the mixing chamber outlet opening. The second feed and return lines 106, 108 communicate through an axial recirculation groove 110 formed in the lateral surface of a control piston 102. In this embodiment, a component containing abrasive filler materials may be preferably passed through the first feed and return lines 105 and 106, rather than the second feed and return lines 106, 108 in order to take advantage of the decreased flow impediment and abrasion characteristics of the straight line recirculation path. This measure reduces the hazards involved in high pressure recirculation through an axial recirculation groove such as excessive heating of the component passing around two 90° bends and eventual surface erosion from the component impinging on the base of the recirculation groove 110 in a sharp jet. Additionally, the straight line recirculation prevents, to a great extent, breaking up of filler material such as glass fibers.

When in the mixing mode, the control piston 102 is retracted, exposing the material input ducts, infeed duct 112 and mixing input duct 116, while recirculation outlet duct 113 and recirculation infeed duct 111 are blocked by the lateral surface of the control piston 102. Fluid communication is blocked between the second feed line 106 and the second return line 108. When the control piston is retracted material from the first feed line 105 flows through the bypass line 115, and is injected into the mixing chamber through a mixing input duct 116. During the mixing period the quieting chamber piston 120 is in the retracted position and partially or fully opens the mixing chamber outlet 118 between the mixing chamber and the quieting chamber. Upon conclusion of the mixing period or "pour" the control piston 102 is advanced into an extended position thereby crossing over from mixing to recirculation and cleaning the mixing chamber. Subsequently, the quieting piston is advanced thereby cleaning the quieting chamber and pushing any mixed components out of the mixing head.

An advantageous utilization of the embodiment according to FIGS. 4 and 5 would be for pouring polyurethane containing a filler material. The two reactive components for such a pour are polyol and isocyanate. The filler material is preferably present in the polyol which would recirculate through the first feed and return lines 105, 107 due to its high abrasion characteristics relative to the isocyanate which recirculates through the second feed and return lines 106, 108.

Figure 6:
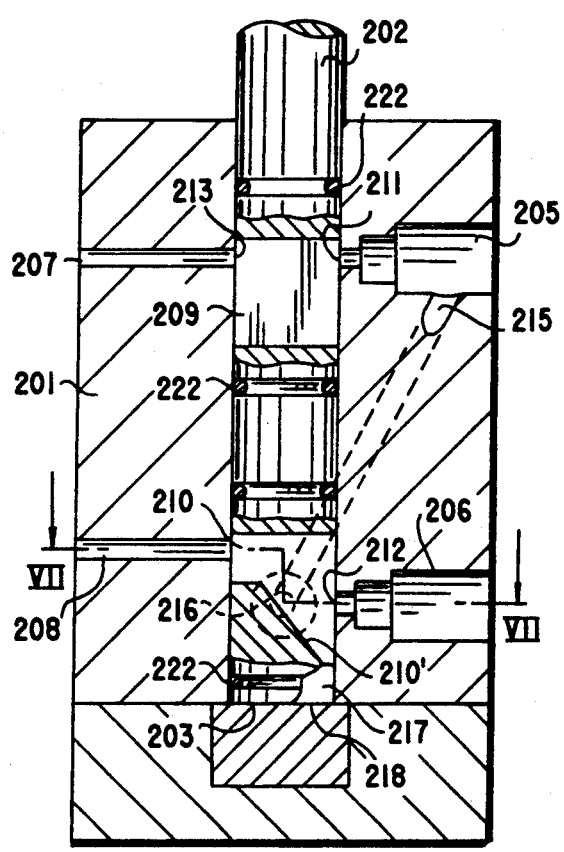
FIG. 6 shows a cross-section through a mixing chamber and control piston, in the recirculation position with a return line for one component axially displaced from its respective feed line.
Figure 7:
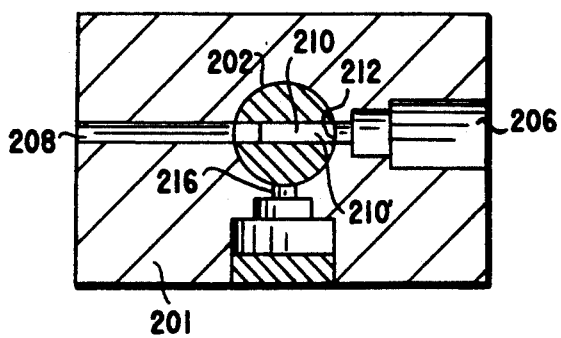
FIG. 7 shows a cross-section through line VII—VII of FIG. 6.

FIGS. 6 and 7 show a mixing chamber housing 201 with a control piston 202 having a planar end face 203. Piston 202 is shown in the recirculation position where a first feed line 205 communicates with a first return line 207 via radial slot 209, and a second feed line 206 communicates with a second return line 208 via radial slot 210.

The first feed line 205 is aligned with return line 207. The second return line 208 is axially displaced from the radial plane of the second feed line 206, away from the mixing chamber outlet 218. This configuration facilitates the control piston, exhibiting a planar end face 203, opening the infeed duct 212 while simultaneously blocking the second return line 208 when in the retracted or mixing position. Similarly, in the mixing position, the first recirculation infeed duct 211 and the first recirculation outlet duct 213 are blocked by lateral surfaces of the control piston and material flows from the first feed line 205, through the bypass line 215 and into the mixing chamber through the now exposed mixing input duct. A mixing device with this configuration may utilize a control piston having a planar end face, straight line recirculation for one component, and only slightly deflected recirculation for a second component. The second radial slot 210 may advantageously be provided with a deflecting surface 210' whereby the component exiting from the first feed line 206 is deflected toward the first return line 208 when the mixing device is in the recirculation mode.

Figure 8:
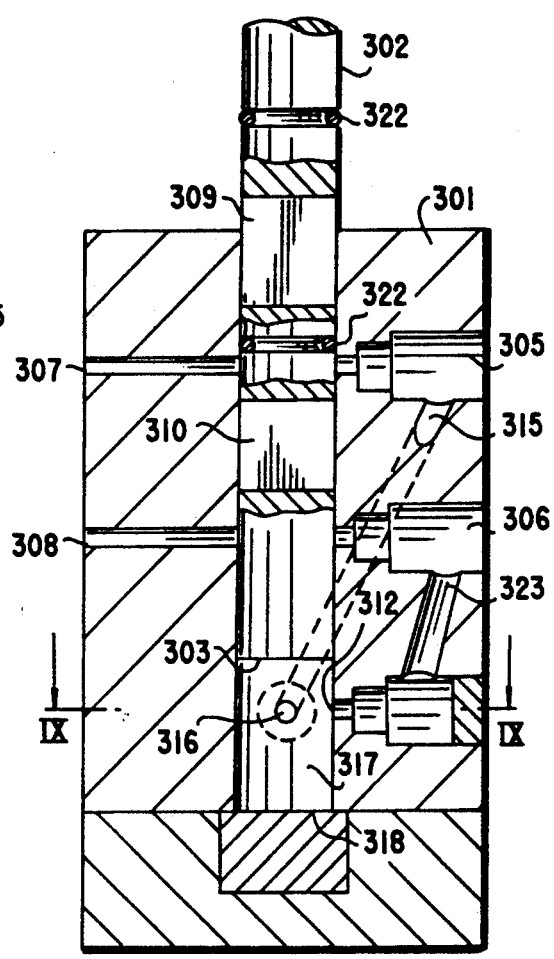
FIG. 8 shows a cross-section through a mixing chamber and control piston, in the mixing position, where the return lines are aligned with their associated feed lines.
Figure 9:
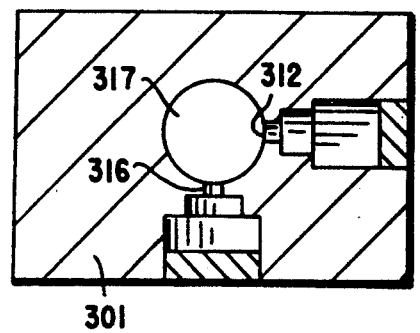
FIG. 9 shows a cross-section through lines IX—IX of FIG. 8.

FIGS. 8 and 9 show a mixing chamber housing 301 with a control piston 302 having a planar end face 303. Piston 302 is shown in the retracted or mixing position. The ends of the feed lines 305, 306 and the return lines 307, 308 and associated recirculation infeed and outlet ducts are blocked by lateral surfaces of the control piston 302. In this embodiment, the two return lines 307, 308 are aligned with their respective feed lines 305, 306. In the recirculation position (not illustrated), the return lines communicate with the respective feed lines through respective radial slots 309, 310 thus enabling straight line recirculation of both components. Each feed line 305, 306 is provided with bypass lines 315, 323 which open out into the mixing chamber 317 at mixing input ducts 312, 316.

In the mixing position, the components flow through the bypass lines 315, 323 and impinge in the mixing chamber. In the recirculation mode the control piston 302 is extended and blocks the mixing chamber input ducts. By the use of two bypass lines, this configuration enables straight line recirculation of two components and utilization of a mixing or control piston exhibiting a planar end face.

Figure 10:
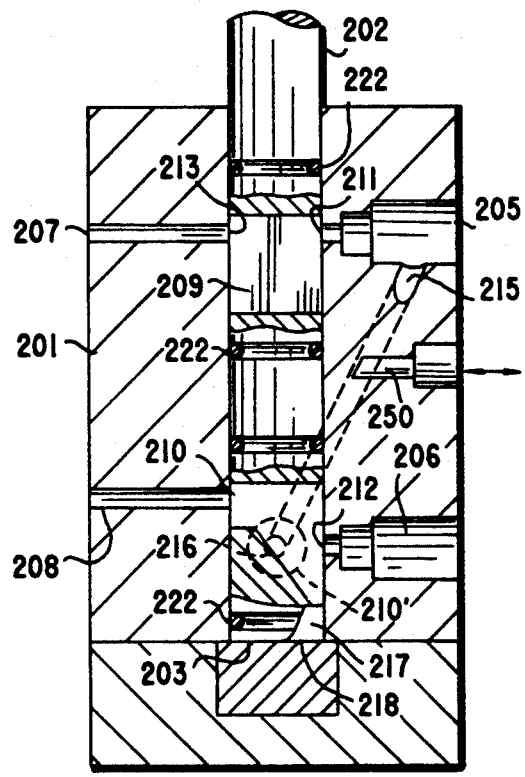
FIG. 10 shows a cross-section with a solenoid pressure-reducing valve device.
Figure 11:
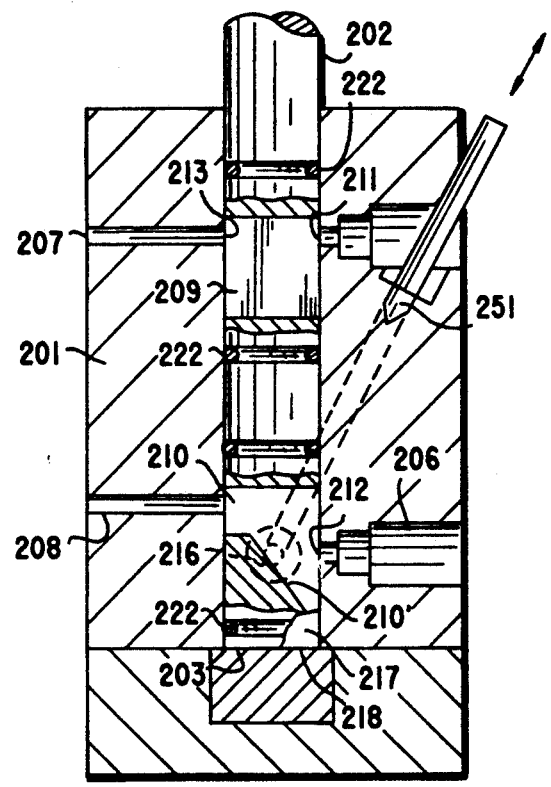
FIG. 11 shows a cross-section with a needle valve pressure-reducing device.

Each bypass line 15, 115, 215, 315, 323 may be controllable by a pressure-reducing device (i.e., reducing valve) as a function of the position of the control piston (2, 102, 202, 302) such that the bypass lines are fully open only when the control piston is in its mixing position. FIG. 10 shows a reciprocal solenoid 250 which operates to block the bypass line. FIG. 11 shows a needle valve 251 which functions to close the bypass line thereby reducing pressure during recirculation in the line and importantly at the material input duct.

Figure 14:
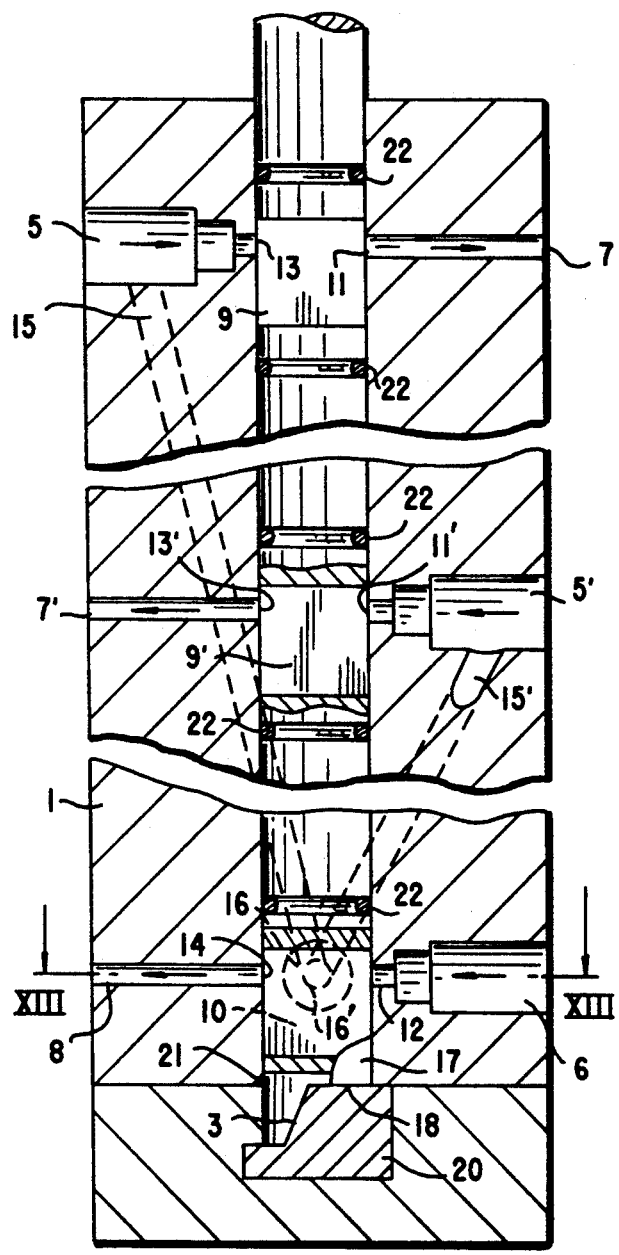
FIG. 14 shows an alternative embodiment with an additional component input arrangement which can be incorporated in any of the illustrated embodiments.
Figure 13:
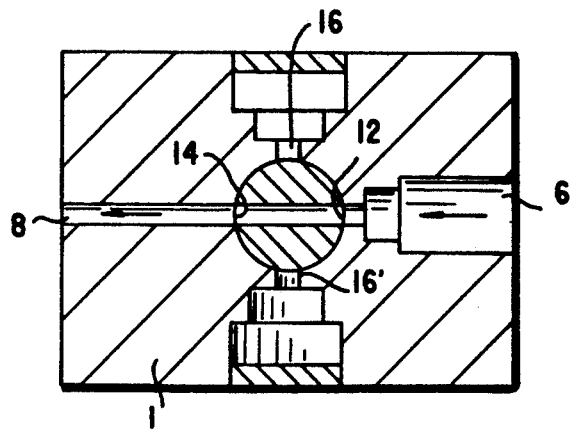
FIG. 13 shows a cross-section through line XIII—XIII of FIG. 14.

The above-described embodiments show feed lines for two components. The invention, however, is not limited to only two recirculating components. There is no limitation in practice on the number of aligned pairs of lines, including a return line and a feed line, with or without bypass lines, branching off from the feed lines. For example, in the embodiment illustrated in FIGS. 8 and 9, it is possible to provide for injection of four plastic components into the mixing chamber, through mixing input ducts disposed at 90° from each other, where each of the mixing input ducts communicate with corresponding feed lines through respective bypass lines. FIGS. 13 and 14 show an embodiment for use with three or more components. The broken-out center portion illustrates an additional component feed line 5', an additional component recirculation return line 7', and an additional passage 9'. The features utilized for the additional components are designed by (') and correspond to those shown in FIGS. 1 and 2.

The features illustrated in the broken out center section of FIG. 14 may be utilized as an additional component input structure in any of the embodiments illustrated in FIGS. 1, 4, 6 or 8.

The radial slots 9, 10, 109, 209, 210, 309, and 310 are in the form of longitudinal slots which extend transversely through the center of the control piston and are axially elongated. Other passage shapes are suitable for the purpose, such as any slot or bore running through the control piston transverse to the lateral surface thereof, where the slot provides for unimpeded flow through the control piston from a feed line to a return line.

Figure 12:
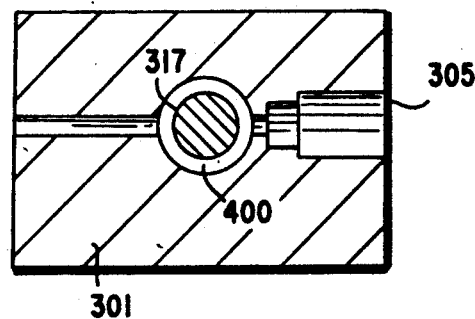
FIG. 12 shows the alternative embodiment of a piston with a circumferential recirculation passage.

Another configuration for the passage through the control piston might comprise a ring-shaped groove 400 in a lateral surface of the piston where the component coming from the feed line is divided into two streams which are reunited when they reenter the return line when the control piston is in the recirculation position as shown in FIG. 12.

FIGS. 15 and 16 illustrate a mixing chamber 17 defined in part by a mixing chamber housing 1 and a control piston 2 that reciprocates under the force of operating piston 4. A redirecting chamber or quieting chamber 19 adjoins the outlet of mixing chamber 17. A redirecting piston or quieting chamber piston 20 is reciprocally movable in channel 19. FIG. 15 shows the quieting chamber piston in a retracted position. FIG. 16 shows the quieting chamber piston in an extended position for discharging a mixture and cleaning the quieting chamber.

Figure 17:
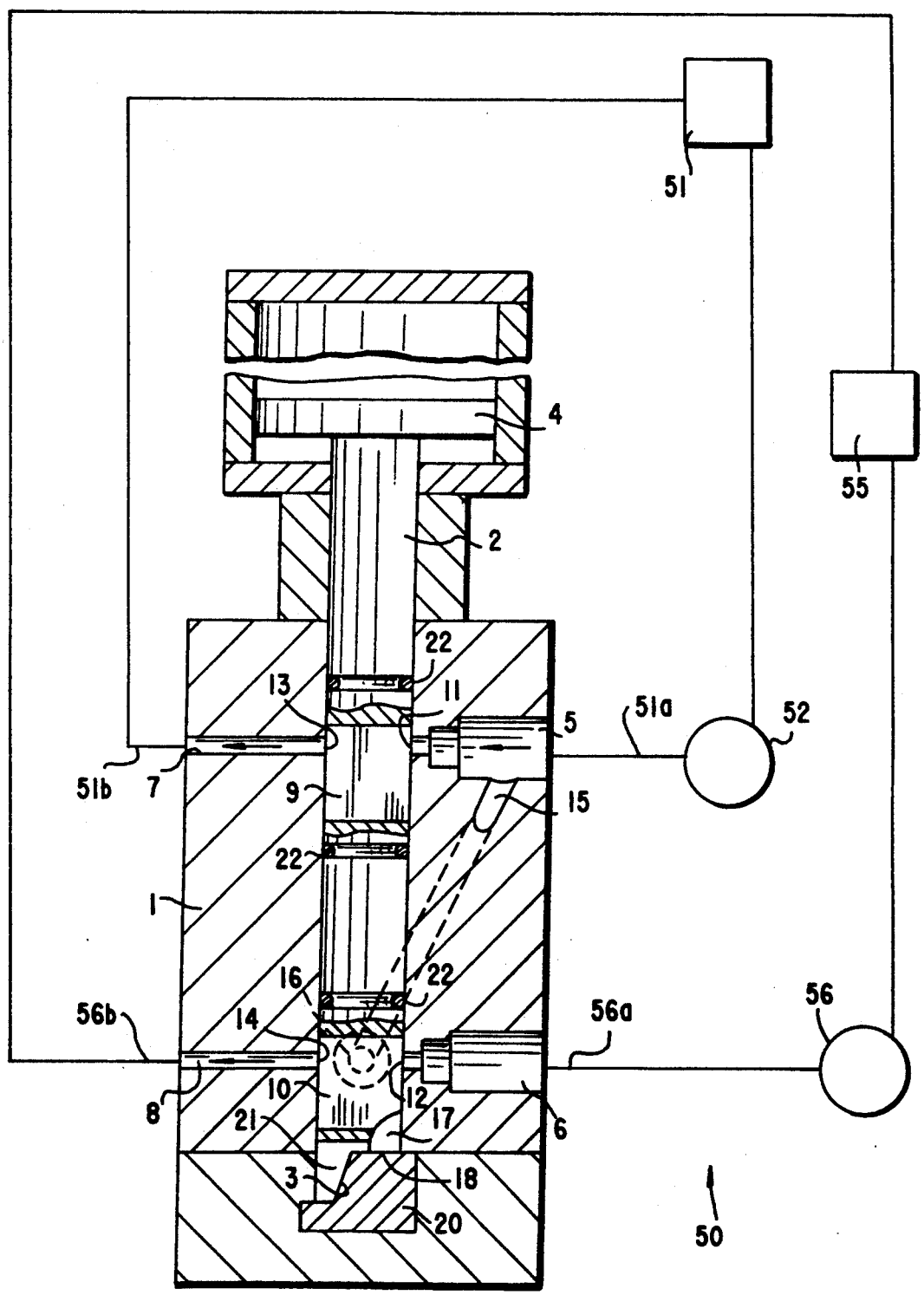
FIG. 17 shows a cross-section through a mixing chamber and control piston, in a recirculation position, with a fluid component recirculation system shown schematically.

FIG. 17 schematically shows a fluid component recirculation system 50 and control piston 2 in the extended position for recirculation mode. The recirculation system includes a pump 52 for recirculating a first fluid component from a reservoir 51 through lines 51a, 51b and first passage or first passage means 9. Likewise, a pump 56 recirculates a second fluid component from a reservoir 55 through lines 56a, 56b and second passage or second passages means 10.

It should also be apparent to those of ordinary skill in the art that the invention is applicable to single chamber mixing heads such as straight mixing heads and to multiple chamber or mixing heads such as transfer mixing heads or L-shaped mixing heads.

I claim:

1. An impingement mixing device comprising:

a mixing chamber housing;

a control piston axially displaceable within said mixing chamber housing between an extended position and a retracted position;

a mixing chamber within said housing defined by an end face of said control piston when in the retracted position and a mixing chamber outlet corresponding with an end face of said control piston when in the extended position;

a first component feed line associated with a first inlet duct in said mixing chamber housing in a first radial plane;

a first component recirculation return line disposed in said mixing chamber housing in said first radial plane and associated with said first component feed line;

first passage means for establishing fluid communication between said first component feed line and said first component recirculation return line, in said control piston, when said control piston is in the extended position;

a first material input duct disposed in a wall of said mixing chamber in a second radial plane wherein said first material input duct is blocked when said control piston is in the extended position;

a first component bypass line between said first component feed line and said first material input duct;

a second component feed line in said mixing chamber housing between said first radial plane and said mixing chamber outlet;

a second component recirculation return line in said mixing chamber housing between said first radial plane and said mixing chamber outlet;

second passage means for establishing fluid communication between said second component feed line and said second component recirculation return line when said control piston is in the extended position;

a second material input duct associated with said second component feed line disposed in a wall of said mixing chamber in said second radial plane;

wherein said first and second material input ducts are exposed, and said first and second component recirculation return lines and first inlet duct are blocked, when said control piston is in the retracted position;

wherein said second component feed line and said second component recirculation return line are disposed in said second radial plane; and said control piston exhibits a stepped end face and a stepped end portion wherein a lateral surface of said stepped end portion blocks said second recirculation return line when said control piston is in said retracted position.

2. An impingement mixing device according to claim 1 further comprising:

a quieting chamber disposed at an angle to said mixing chamber and connected at said mixing chamber outlet, said quieting chamber exhibiting a contour which mates with a contour displayed by said end face of said control piston;

a quieting chamber piston axially displaceable in said quieting chamber for at least partially opening communication between said mixing chamber and said quieting chamber and cleaning said quieting chamber.

3. An impingement mixing device according to claim 1 further comprising:

at least one means for recirculating and mixing an additional component each comprising;

an additional component feed line associated with an additional inlet duct in said mixing chamber housing in an additional radial plane;

an additional component recirculation return line disposed in said mixing chamber housing in said additional radial plane and associated with said additional component feed line;

additional passage means for establishing fluid communication between said additional component feed line and said additional component recirculation return line in said control piston when said control piston is in the extended position;

an additional material input duct disposed in a wall of said mixing chamber in said second radial plane wherein said additional material input duct is blocked when said control piston is in the extended position;

an additional component bypass line between said additional component feed line and said additional material input duct;

wherein said additional inlet duct and said additional component recirculation return line is blocked by a lateral surface of said control piston when in the retracted position.

4. An impingement mixing device according to claim 1 wherein said first passage means and said second passage means are slots radially traversing said control piston.

5. An impingement mixing device according to claim 1 wherein said first passage means is a circumferential groove in said control piston.

6. An impingement mixing device according to claim 1 including means for reducing pressure in said bypass line when the control piston is in the retracted position.

7. An impingement mixing device according to claim 1 wherein said first passage means exhibits a cross-section area at least as large as a cross-sectional area of said first component recirculation return line and first input duct.

8. An impingement mixing device according to claim 1 further comprising ring seals circumferentially disposed on said control piston.

9. An impingement mixing device comprising:

a mixing chamber housing;

a control piston axially displaceable within said mixing chamber housing between an extended position and a retracted position;

an operating piston connected to said control piston;

a mixing chamber within said housing defined by an end face of said control piston when in the retracted position and a mixing chamber outlet corresponding with an end face of said control piston when in the extended position;

a first component feed line associated with a first inlet duct in said mixing chamber housing in a first radial plane located between said operating piston and said mixing chamber outlet;

a first component recirculation return line disposed in said mixing chamber housing in said first radial plane and associated with said first component feed line;

first passage means for establishing fluid communication between said first component feed line and said first component recirculation return line, in said control piston, when said control piston is in the extended position;

a first component input duct disposed in a wall of said mixing chamber in a second radial plane and opening into said mixing chamber, wherein said first component input duct is blocked when said control piston is in the extended position;

a first component bypass line between said first component feed line and said first component input duct;

a second component feed line in said mixing chamber housing in said second radial plane;

a second component recirculation return line in said mixing chamber housing between said first radial plane and said mixing chamber outlet;

a second component input duct associated with said second component feed line disposed in a wall of said mixing chamber in said second radial plane and opening into said mixing chamber;

second passage means for establishing fluid communication between said second component input duct and said second component recirculation return line and said second passage means opens into said second component input duct and said second component recirculation return line when said control piston is in the extended position;

wherein said first and second component input ducts are exposed, and said first and second component recirculation return lines and first inlet duct are blocked when said control piston is in the retracted position;

wherein said second component recirculation return line is axially displaced from said second component feed line toward said first radial plane, and said second passage means is an axially arranged recirculation groove disposed on a lateral surface of said control piston.

10. An impingement mixing device according to claim 9 further comprising:

a quieting chamber disposed at an angle to said mixing chamber and connected at said mixing chamber outlet, said quieting chamber exhibiting a contour which mates with a contour displayed by said end face of said control piston;

a quieting chamber piston axially displaceable in said quieting chamber for at least partially opening communication between said mixing chamber and said quieting chamber, and cleaning said quieting chamber.

11. An impingement mixing device according to claim 9 further comprising:

at least one means for recirculating and mixing an additional component each comprising;

an additional component feed line associated with an additional inlet duct in said mixing chamber housing in an additional radial plane;

an additional component recirculation return line disposed in said mixing chamber hosing in said additional radial plane and associated with said additional component feed line;

additional passage means for establishing fluid communication between said additional component feed line and said additional component recirculation return line in said control piston when said control piston is in the extended position;

an additional component input duct disposed in a wall of said mixing chamber in said second radical plane and opening into said mixing chamber, wherein said additional component input duct is blocked when said control piston is in the extended position;

an additional component bypass line between said additional component feed line and said additional component input duct;

wherein said additional inlet duct and said additional component recirculation return line are blocked by a lateral surface of said control piston when in the retracted position.

12. An impingement mixing device according to claim 9 wherein said first passage means and said second passage means are slots radially traversing said control piston.

13. An impingement mixing device according to claim 9 wherein said first passage means is a circumferential groove in said control piston.

14. An impingement mixing device according to claim 9 including means for reducing pressure in said bypass line when the control piston is in the retracted position.

15. An impingement mixing device according to claim 9 wherein said first passage means exhibits a cross-section area at least as large as a cross-sectional area of said first component recirculation return line and first input duct.

16. An impingement mixing device according to claim 9 further comprising ring seals circumferentially disposed on said control piston.

17. An impingement mixing device comprising:

a mixing chamber housing;

a control piston axially displaceable within said mixing chamber housing between an extended position and a retracted position;

an operating piston connected to said control piston;

a mixing chamber within said housing defined by an end face of said control piston when in the retracted position and a mixing chamber outlet corresponding with an end face of said control piston when in the extended position;

a first component feed line associated with a first inlet duct in said mixing chamber housing in a first radial plane located between said operating piston and said mixing chamber outlet;

a first component recirculation return line disposed in said mixing chamber housing in said first radial plane and associated with said first component feed line;

first passage means for establishing fluid communication between said first component feed line and said first component recirculation return line, in said control piston, when said control piston is in the extended position;

a first component input duct disposed in a wall of said mixing chamber in a second radial plane and opening into said mixing chamber, wherein said first component input duct is blocked when said control piston is in the extended position;

a first component bypass line between said first component feed line and said first component input duct;

a second component feed line in said mixing chamber housing in said second radial plane;

a second component recirculation return line in said mixing chamber housing between said first radial plane and said mixing chamber outlet;

a second component input duct associated with said second component feed line disposed in a wall of said mixing chamber in said second radial plane and opening into said mixing chamber;

second passage means in said control piston for establishing fluid communication between said second component input duct and said second component recirculation return line and said second passage means opens into said second component input duct and said second component recirculation return line when said control piston is in the extended position;

wherein said first and second component input ducts are exposed, and said first and second component recirculation return lines and first inlet duct are blocked when said control piston is in the retracted position;

wherein said second component recirculation return line is radially opposed to and axially displaced toward said first radial plane from said second component feed line; and said control piston exhibits a planar end face.

18. An impingement mixing device according to claim 17 further comprising:

a quieting chamber disposed at an angle to said mixing chamber and connected at said mixing chamber outlet, said quieting chamber exhibiting a contour which mates with a contour displayed by said end face of said control piston;

a quieting chamber piston, axially displaceable in said quieting chamber for at least partially opening communication between said mixing chamber and said quieting chamber and cleaning said quieting chamber.

19. An impingement mixing device according to claim 17 further comprising:

at least one means for recirculating and mixing an additional component each comprising:

an additional component feed line associated with an additional inlet duct in said mixing chamber housing in an additional radial plane;

an additional component recirculation return line disposed in said mixing chamber housing in said additional radial plane and associated with said additional component feed line;

additional passage means for establishing fluid communication between said additional component feed line and said additional component recirculation return line in said control piston when said control piston is in the extended position;

an additional component input duct disposed in a wall of said mixing chamber in said second radial plane and opening into said mixing chamber, wherein said additional component input duct is blocked when said control piston is in the extended position;

an additional component bypass line between said additional component feed line and said additional component input duct;

wherein said additional inlet duct and said additional component recirculation return line are blocked by a lateral surface of said control piston when in the retracted position.

20. An impingement mixing device according to claim 17 wherein said first passage means and said second passage means are slots radially traversing said control piston.

21. An impingement mixing device according to claim 17 wherein said first passage means is a circumferential groove in said control piston.

22. An impingement mixing device according to claim 17 including means for reducing pressure in said bypass line when the control piston is in the retracted position.

23. An impingement mixing device according to claim 17 wherein said first passage means exhibits a cross-section area at least as large as a cross-sectional area of said first component recirculation return line and first input duct.

24. An impingement mixing device according to claim 17 further comprising ring seals circumferentially disposed on said control piston.

25. An impingement mixing device comprising:

a mixing chamber housing;

a mixing piston axially displaceable within said mixing chamber housing between an extended position and a retracted position wherein said mixing piston is a control piston;

an operating piston connected to said mixing piston;

a mixing chamber within said housing defined by an end face of said mixing piston when in the retracted position and a mixing chamber outlet corresponding with an end face of said mixing piston when in the extended position;

a first component feed line in a first radial plane associated with a first inlet duct in said mixing chamber housing wherein said first radial plane is between said operating piston and said mixing chamber outlet;

a first component recirculation return line disposed in said mixing chamber housing in said first radial plane and associated with said first component feed line;

a first passage in said mixing piston located in said first radial plane establishing fluid communication between said first component feed line and said first component recirculation return line when said mixing piston is in the extended position;

a first component input duct disposed in a wall of said mixing chamber in a second radial plane and opening into said mixing chamber, wherein said first component input duct is blocked when said mixing piston is in the extended position;

a first component bypass line between said first component feed line and said first component input duct;

a second component feed line in said mixing chamber housing between said first radial plane and said mixing chamber outlet;

a second component recirculation return line in said mixing chamber housing between said first radial plane and said mixing chamber outlet;

a second passage in said mixing piston located between said first radial plane and said mixing chamber outlet establishing fluid communication between said second component feed line and said second component recirculation return line when said control piston is in the extended position;

a second component input duct associated with said second component feed line disposed in a wall of said mixing chamber in said second radial plane and opening into said mixing chamber;

wherein said first and second component input ducts are exposed, and said first and second component recirculation return lines and said first inlet duct are blocked, when said control piston is in the retracted position;

a second inlet duct associated with said second component feed line in an inner wall of said mixing chamber housing disposed at a third radial plane between said first radial plane and said second radial plane;

a second component bypass line between said second component feed line and said second component input duct;

wherein said second component recirculation return line is disposed in said third radial plane; and a lateral surface of said control piston blocks said second inlet duct when in the retracted position.

26. An impingement mixing device according to claim 25 further comprising:
a quieting chamber disposed at an angle to said mixing chamber and connected at said mixing chamber outlet, said quieting chamber exhibiting a contour which mates with a contour displayed by said end face of said mixing piston;
a quieting chamber piston, axially displaceable in said quieting chamber for at least partially opening communication between said mixing chamber and said quieting chamber and cleaning said quieting chamber.

27. An impingement mixing device according to claim 25 further comprising:
at least one means for recirculating and mixing an additional component each comprising:
an additional component feed line associated with an additional inlet duct in said mixing chamber housing in an additional radial plane;
an additional component recirculation return line disposed in said mixing chamber housing in said additional radial plane and associated with said additional component feed line;
additional passage means for establishing fluid communication between said additional component feed line and said additional component recirculation return line in said mixing piston when said mixing piston is in the extended position;
an additional component input duct disposed in a wall of said mixing chamber in said second radial plane and opening into said mixing chamber, wherein said additional component input duct is blocked when said mixing piston is in the extended position;
an additional component bypass line between said additional component feed line and said additional component input duct;
wherein said additional inlet duct and said additional component recirculation return line are blocked by a lateral surface of said mixing piston when in the retracted position.

28. An impingement mixing device according to claim 5 wherein said first passage and said second passage are slots radially traversing said mixing piston.

29. An impingement mixing device according to claim 25 wherein said first passage and said second passage are circumferential grooves in said mixing piston.

30. An impingement mixing device according to claim 25 including means for reducing pressure in said bypass line when the control piston is in the retracted position.

31. An impingement mixing device according to claim 25 wherein said first passage means exhibits a cross-section area at least as large as a cross-sectional area of said first component recirculation return line and first input duct.

32. An impingement mixing device according to claim 25 further comprising ring seals circumferentially disposed on said control piston.

33. An impingement mixing device comprising:
a mixing chamber housing;
a control piston axially displaceable within said mixing chamber housing between an extended position and a retracted position;
an operating piston connected to said control piston;
a mixing chamber within said housing defined by an end face of said control piston when in the retracted position and a mixing chamber outlet coresponding with an end face of said control piston when in the extended position;
a first component feed bore associated with a first inlet duct in said mixing chamber housing in a first radial plane located between said operating piston and said mixing chamber outlet;
a first component recirculation return bore disposed in said mixing chamber housing in said first radial plane and associated with said first component feed bore;
first passage means in said control piston for establishing fluid communication between said first component feed bore and said first component recirculation return bore, when said control piston is in the extended position;
a first component input duct disposed in a wall of said mixing chamber in a second radial plane and opening into said mixing chamber, wherein said first component input duct is blocked when said control piston is in the extended position;
a first component bypass bore located entirely within a wall of said mixing chamber housing between said first component feed bore and said first component input duct;
a second component feed bore in said mixing chamber housing in said second radial plane;
a second component recirculation return bore in said mixing chamber housing between said first radial plane and said mixing chamber outlet;
a second component input duct associated with said second component feed bore disposed in a wall of said mixing chamber in said second radial plane and opening into said mixing chamber;
second passage means in said control piston for establishing fluid communication between said second component input duct and said second component recirculation return bore and said second passage means opens into said second component input duct and said second component recirculation return bore when said control piston is in the extended position;
wherein said first and second component input ducts are exposed, and said first and second component recirculation return bores and first inlet duct are blocked when said control piston is in the retracted position;
wherein said second component recirculation return bore is axially displaced from said second component feed bore toward said first radial plane, and said second passage means is an axially arranged recirculation groove disposed on a lateral surface of said control piston.

34. An impingement mixing device comprising:
a mixing chamber housing;
a control piston axially displaceable within said mixing chamber housing between an extended position and a retracted position;
an operating piston connected to said control piston;
a mixing chamber within said housing defined by an end face of said control piston when in the retracted position and a mixing chamber outlet corresponding with an end face of said control piston when in the extended position;
a first component feed bore associated with a first inlet duct in said mixing chamber housing in a first radial plane located between said operating piston and said mixing chamber outlet;
a first component recirculation return bore disposed in said mixing chamber housing in said first radial plane and associated with said first component feed bore;
first passage means in said control piston for establishing fluid communication between said first component feed bore and said first component recirculation return bore, when said control piston is in the extended position;
a first component input duct disposed in a wall of said mixing chamber in a second radial plane and opening into said mixing chamber, wherein said first component input duct is blocked when said control piston is in the extended position;
a first component bypass bore located entirely within a wall of said mixing chamber housing between said first component feed bore and said first component input duct;
a second component feed bore in said mixing chamber housing in said second radial plane;
a second component recirculation return bore in said mixing chamber housing between said first radial plane and said mixing chamber outlet;
a second component input duct associated with said second component feed bore disposed in a wall of said mixing chamber in said second radial plane and opening into said mixing chamber;
second passage means in said control piston for establishing fluid communication between said second component input duct and said second component recirculation return bore and said second passage means opens into said second component input duct and said second component recirculation return bore when said control piston is in the extended position;
wherein said first and second component input ducts are exposed, and said first and second component recirculation return bores and first inlet duct are blocked when said control piston is in the retracted position;
wherein said second component recirculation return bore is radially opposed to and axially displaced toward said first radial plane from said second component feed bore.

35. An impingement mixing device according to claim 34, wherein said control piston exhibits a planar end face.

36. An impingement mixing device comprising:
a mixing chamber housing;
a mixing piston axially displaceable within said mixing chamber housing between an extended position and a retracted position wherein said mixing piston is a control piston;
an operating piston connected to said mixing piston;
a mixing chamber within said housing defined by an end face of said mixing piston when in the retracted position and a mixing chamber outlet corresponding with an end face of said mixing piston when in the extended position;
a first component feed bore in a first radial plane associated with a first inlet duct in said mixing chamber housing wherein said first radial plane is between said operating piston and said mixing chamber outlet;
a first component recirculation return bore disposed in said mixing chamber housing in said first radial plane and associated with said first component feed bore;
a first passage in said mixing piston located in said first radial plane establishing fluid communication between said first component feed bore and said first component recirculation return bore when said mixing piston is in the extended position;
a first component input duct disposed in a wall of said mixing chamber in a second radial plane and opening into said mixing chamber, wherein said first component input duct is blocked when said mixing piston is in the extended position;
a first component bypass bore located entirely within a wall of said mixing chamber housing between said first component feed bore and said first component input duct;
a second component feed bore in said mixing chamber housing between said first radial plane and said mixing chamber outlet;
a second component recirculation return bore in said mixing chamber housing between said first radial plane and said mixing chamber outlet;
a second passage in said mixing piston located between said first radial plane and said mixing chamber outlet establishing fluid communication between said second component feed bore and said second component recirculation return bore when said control piston is in the extended position;
a second component input duct associated with said second component feed bore disposed in a wall of said mixing chamber in said second radial plane and opening into said mixing chamber;
wherein said first and second component input ducts are exposed, and said first and second component recirculation return bores and said first inlet duct are blocked, when said control piston is in the retracted position;
a second inlet duct associated with said second component feed bore in an inner wall of said mixing chamber housing disposed at a third radial plane between said first radial plane and said second radial plane;
a second component bypass bore located entirely within a wall of said mixing chamber between said second component feed bore and said second component input duct;
wherein said second component recirculation return bore is disposed in said third radial plane; and
a lateral surface of said control piston blocks said second inlet duct when in the retracted position.

* * * * *